United States Patent
Toth et al.

(10) Patent No.: US 6,665,477 B2
(45) Date of Patent: Dec. 16, 2003

(54) UNDERSEA OPTICAL FIBER TELECOMMUNICATION SYSTEM AND METHOD

(75) Inventors: John R. Toth, Clermont, FL (US); John P. Strauss, Ormond Beach, FL (US)

(73) Assignee: Ocean Design, Inc., Ormond Beach, FL (US)

( * ) Notice: Subject to any disclaimer, the term of this patent is extended or adjusted under 35 U.S.C. 154(b) by 0 days.

(21) Appl. No.: 09/912,701

(22) Filed: Jul. 24, 2001

(65) Prior Publication Data

US 2003/0021555 A1 Jan. 30, 2003

(51) Int. Cl.⁷ ................................................. G02B 6/44
(52) U.S. Cl. ......................... 385/100; 385/71; 385/139
(58) Field of Search ........................... 385/56, 60, 70, 385/71, 72, 75, 88, 89, 90, 92, 94, 100, 102, 139; 439/275, 276, 310, 311

(56) References Cited

U.S. PATENT DOCUMENTS 4,050,765 A * 9/1977 Duesterhoeft et al. ...... 439/204
5,738,535 A    4/1998 Cairns

OTHER PUBLICATIONS

Perry Joseph Wright, "Optical Fiber's Gigabit Bandwidth, 200 km Range Attractive for Subsea Work", Offshore, May 2000.
Stewart Barlow, "Advances in Undersea Connector Technology Improve Efficiency", Lightwave Special Reports, Oct. 1999.

* cited by examiner

Primary Examiner—Euncha Cherry

(57) ABSTRACT

A modular undersea optical fiber telecommunication system includes a plurality of fiber optic cable segments each containing fibers of a fiber type different from at least some of the other cable segments. Each cable segment has a plug unit at one end and a receptacle unit at the opposite end comprising mating halves of an underwater connector. The connector units contain a plurality of optical fiber contact terminals, and each optical fiber in the cable segment is terminated to a respective one of the contact terminals in the plug unit at one end and to a respective one of the contact terminals in the receptacle unit at the opposite end. The plug unit of each cable segment is releasably securable to a receptacle unit of a selected second cable segment and the receptacle unit of each cable segment is releasably securable to a plug unit of a selected third cable segment, such that the optical fibers in the cable segment are connected with the fibers in the second and third cable segments without requiring splices.

18 Claims, 4 Drawing Sheets

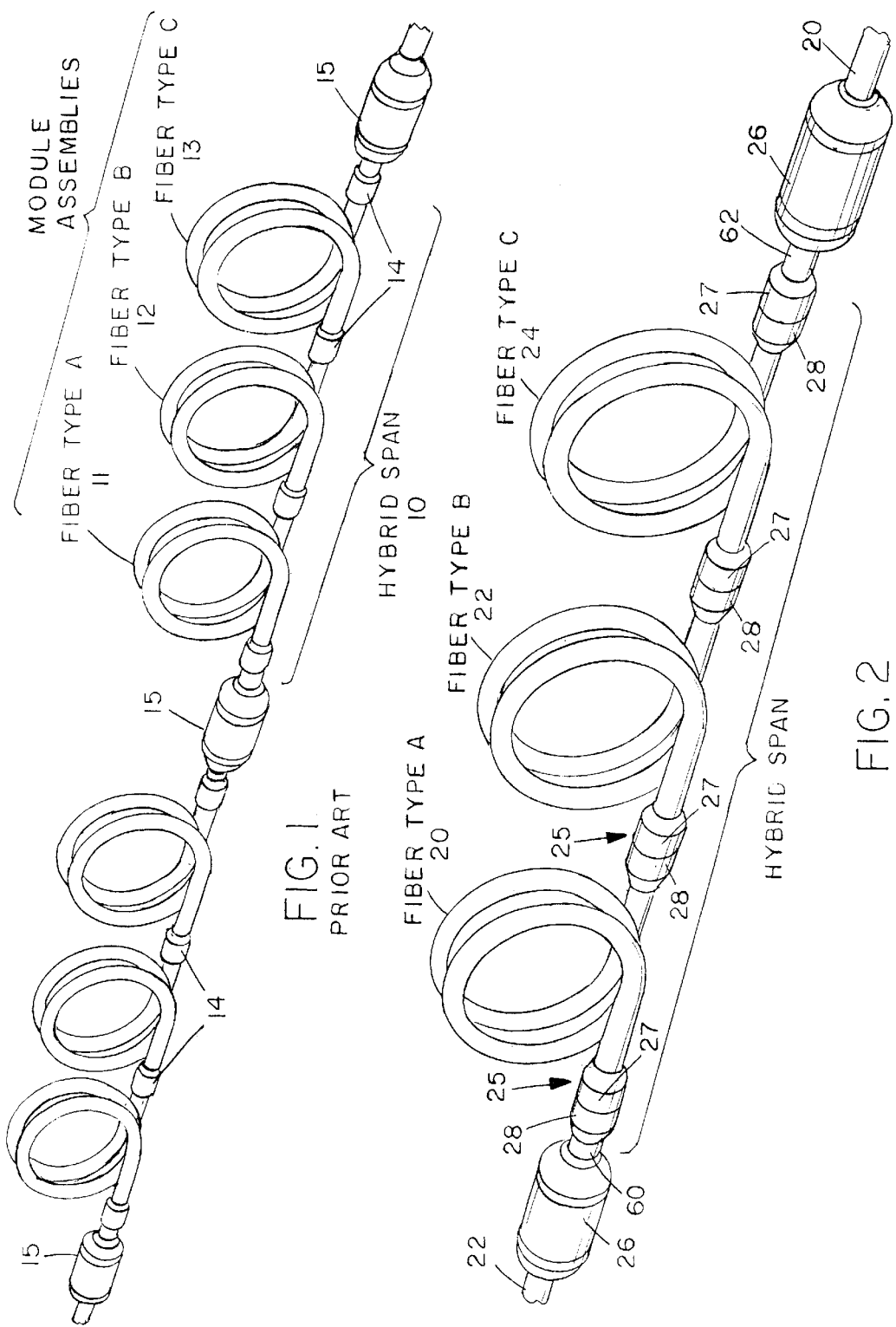

UNDERSEA OPTICAL FIBER TELECOMMUNICATION SYSTEM AND METHOD

BACKGROUND OF THE INVENTION

The present invention relates to undersea or transoceanic fiber optic communication cable systems.

Optical fiber segments of undersea optical cable systems are typically joined together sequentially by splicing together successive optical cable ends. This is normally done on board a cable ship prior to submerging the cable, which is an expensive, time consuming, and labor-intensive process. This process is also prone to errors. Once the cable is laid on the sea floor, adjusting or interchanging cable lengths or segments is difficult or impossible.

Optical fiber transmission media suffer from an inherent physical limitation called chromatic dispersion. Chromatic dispersion results from the fact that different wavelengths of light travel through an optical fiber at slightly different speeds, or, more accurately, different optical wavelengths are delayed by different amounts as they pass through the fiber. Because of this phenomenon, an information-bearing light pulse, which will consist of a range of wavelengths, becomes "spread out" or "smeared" as it travels through a given length of optical fiber. In typical communications systems, many such pulses are transmitted in extremely rapid sequence, with the net result that neighboring pulses can be "smeared" together, or overlap, making it difficult for the receiver to distinguish the information contained in each pulse. When the receiver cannot accurately distinguish one pulse from the next, an error condition occurs. If such errors are not corrected, the performance of the optical fiber communications link becomes severely degraded. Since each pulse becomes increasingly "smeared" as it travels farther along an optical fiber, the extremely long fiber length used in transoceanic cable systems makes them particularly vulnerable to the errors resulting from dispersion if steps are not taken to mitigate such effects.

In order to reduce the deleterious effects of chromatic dispersion in optical networks, several different types of optical fiber have been developed which have different dispersion properties. Among these, for example, are nonzero-dispersion shifted fiber (NZDF), Lucent Technologies TrueWave®, and Corning's LEAF® and SMF-28® optical fibers. Recently, Lucent Technologies and Corning, among others, have discovered a way of compensating for chromatic dispersion by joining segments of these different types of fiber together in predetermined sequences. This technique is generally known as the "hybrid fiber approach" to dispersion management, and the combination of different fiber segments is known as a hybrid span.

A hybrid span generally consists of a series of segments of two to three different fiber types joined to the output of each fiber amplifier in a submarine or undersea cable system. Different fiber manufacturers have produced different specifications for the sequences and lengths of fibers in a hybrid span. The hybrid span approach to dispersion management needs to be able to balance overall, or end-to-end, system dispersion, minimize attenuation caused by splice and bend losses, maximize flexibility with respect to in-situ segment length adjustment or tuning, and minimize the costs for manufacture, deployment, and operation of hybrid fiber spans. The current state of the art does not meet these requirements, since fiber lengths are joined by splicing, and a previously spliced cable system does not lend itself to modification once the fiber segments are spliced and laid on the seafloor, and results in a heavy cost burden both for modifying an existing seafloor cable system, or for laying a new hybrid cable system. Once the spliced cable is laid on the sea floor, adjusting the lengths of the different types of fiber segments and/or interchange of segments becomes difficult or impossible, thereby rendering it difficult or impossible to optimize the performance of the cable system. Another problem with the existing cable splicing technique is that fusion splicing of different fiber types creates a new set of problems related to the unique mechanical and optical characteristics of each type of fiber. Thus, splicing of hybrid spans will add a considerable cost burden to the construction of a transoceanic cable system.

SUMMARY OF THE INVENTION

It is an object of the present invention to provide a new and improved undersea optical fiber telecommunication system and method permitting use of hybrid dispersion compensation techniques.

According to one aspect of the present invention, a modular undersea optical fiber telecommunication system is provided, which comprises a plurality of cable segments of different fiber types and lengths, each cable segment containing a plurality of optical fibers and having a first end secured to a connector plug unit and a second end secured to a connector receptacle unit, each connector unit containing a plurality of optical fiber contact terminals, each optical fiber in the cable segment being terminated to a respective one of the contact terminals in the plug unit at one end and to a respective one of the contact terminals in the receptacle unit at the opposite end of the cable segment, the plug unit of each cable segment being releasably securable to a receptacle unit of a selected second cable segment and the receptacle unit of each cable segment being releasably securable to a plug unit of a selected third cable segment, whereby the optical fibers in said cable segment are connected with the fibers in the second and third cable segments, and a plurality of the cable segments can be selectively secured together in a predetermined sequence.

The system may also include a plurality of optical amplifier devices or other active or passive optical devices, each device having a connector plug unit at one end and a connector receptacle unit at the other end for releasable connection to a receptacle and plug unit, respectively, of cable segments to be secured in line with the optical device. The connector units may be wet-mateable or dry-mateable, and may be fiber optic connectors or hybrid electrical/optical connectors where the cable system is to carry both optical and electrical signals. If the connector units are wet-mateable, the cable system can be readily modified or tuned after installation on the sea floor, simply by releasing the connector units of both ends of a cable segment to be removed, and replacing it with a cable segment containing a different type of fiber or of a different length, or both, depending on tuning requirements.

According to another aspect of the present invention, a method of installing a suboceanic hybrid optical fiber cable system is provided, which comprises the steps of:

determining a desired sequence of successive telecommunication cable segments of predetermined length, fiber count, and fiber type, whereby at least some cable segments in the sequence are of different fiber types and at least some cable segments in the sequence are of different lengths;

securing the cable segments together end-to-end in the desired sequence by securing a connector plug unit at one end of a first cable segment in the sequence to a connector receptacle unit at one end of a second cable segment in the sequence, securing a connector plug unit at the opposite end of the second cable segment to a connector receptacle unit of a third cable segment in the sequence, and repeating the operation until a desired hybrid sequence is completed; and installing the hybrid sequence of connected cable segments on the ocean floor to provide a transoceanic cable system.

The cable segments may be secured together on a cable ship and then submerged, or successive segments may be submerged and connected underwater by a remotely operated underwater vehicle. Optical devices such as optical amplifiers may be secured at predetermined intervals in the hybrid sequence, with a hybrid span of two or more cable segments between successive fiber amplifiers. Each optical device may be provided with a plug unit at one end and a receptacle unit at the opposite end for releasable connection between adjacent cable segments.

The method and system of this invention allows a hybrid cable sequence of any desired length to be installed on the ocean floor easily and inexpensively, avoiding all the problems of splicing together different fiber types by fusion, since the modular system uses connectors to establish the physical contact junction between the different fibers, rather than an actual fusion splice. This system also permits a hybrid span to be readily tuned by removing and replacing cable segments simply by releasing the connector units at opposite ends of a segment to be removed, and attaching a new segment in its place using identical connector units at opposite ends of the new segment. Thus, cable segments can be recovered, tuned, and redeployed easily on an as-needed basis. The method and system can be used for new telecommunication cable construction, retrofitting of existing cable spans using hybrid span technology for reducing dispersion, and tuning of hybrid spans for improved results.

BRIEF DESCRIPTION OF THE DRAWINGS

The present invention will be better understood from the following detailed description of an exemplary embodiment of the invention, taken in conjunction with the accompanying drawings in which like reference numerals refer to like parts and in which:

FIG. 1 is a schematic view of a typical prior art hybrid span of cables;

FIG. 2 is a similar view showing an improved cable system according to an exemplary embodiment of the invention;

DETAILED DESCRIPTION OF THE DRAWINGS

Figure 3:
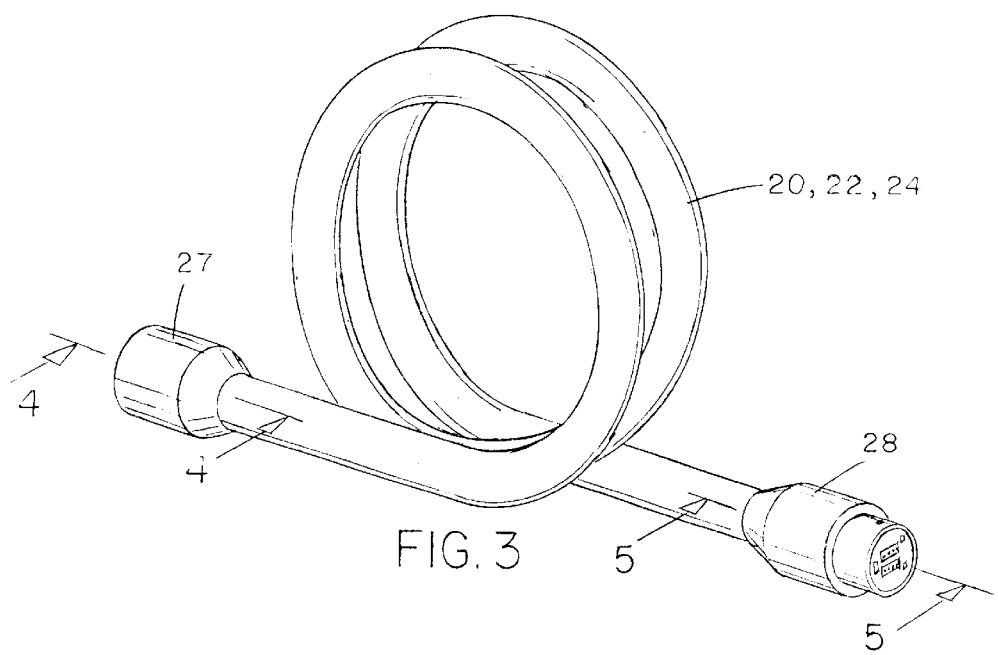
FIG. 3 is an enlarged view of a single cable segment of the system of FIG. 2.

FIG. 1 of the drawings illustrates a prior art hybrid fiber optic cable system of repeated hybrid fiber spans 10 each consisting of two, three or more cable segments secured together at their adjacent ends by fusion splices 14. Typically, each fiber span 10 will comprise two or more cable segments containing different types of fiber and/or different cable lengths. Thus, one hybrid span in FIG. 1 has a first cable segment 11 of fiber type A, a second cable segment 12 of fiber type B, and a third cable segment 13 of fiber type C. Optical amplifiers 15 are spliced between adjacent hybrid fiber spans.

In this prior art cable system, each fiber at each end of a cable segment must be individually cut, cleaned, polished and fused to its partner fiber in the adjacent cable segment by application of heat. Fusion splicing is typically carried out in the field, on board a cable ship, making it an expensive, lengthy, labor-intensive and error-prone technique. Adding hybrid spans in this way significantly increases the number of splices needed for a transoceanic cable system, and thus significantly increases the overall cost of deployment. Although hybrid spans may be pre-spliced either during manufacture or before they are coiled into the storage tanks of cable-laying ships, the splicing step is still labor-intensive and expensive. Additionally, the main drawback of spliced hybrid spans is their inflexibility after the cable is manufactured and/or laid. Once the cable is spliced and laid on the sea floor, adjustment in the lengths of cable segments or the types of fibers, or interchange of cable segments, becomes more or less impossible, making it difficult or impossible to optimize the performance of a hybrid cable system. The splicing together of two different types of fiber can also create problems, due to the different mechanical and optical properties of the different fiber types.

Figure 5:
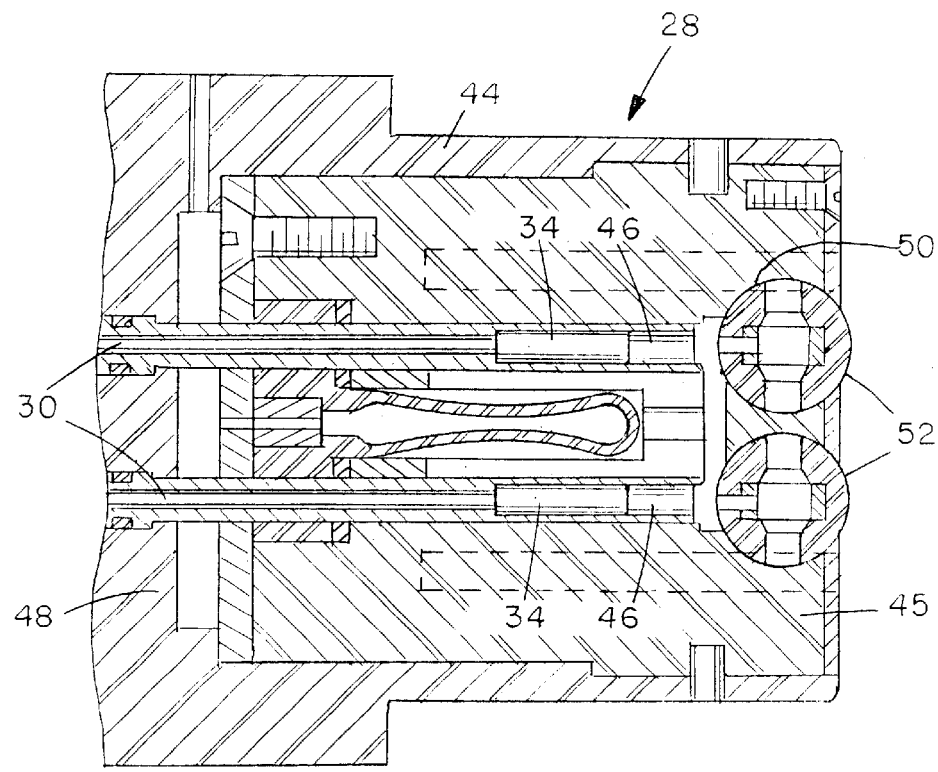
FIG. 5 is an enlarged sectional view taken on line 5—5 of FIG. 3.
Figure 6:
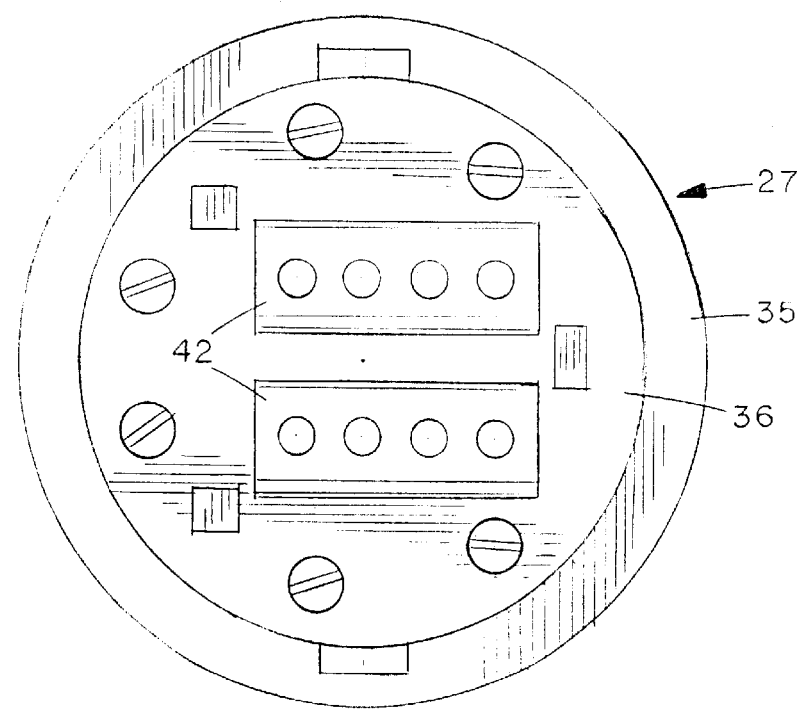
FIG. 6 is a left hand end view of the connector element of FIG. 4.
Figure 7:
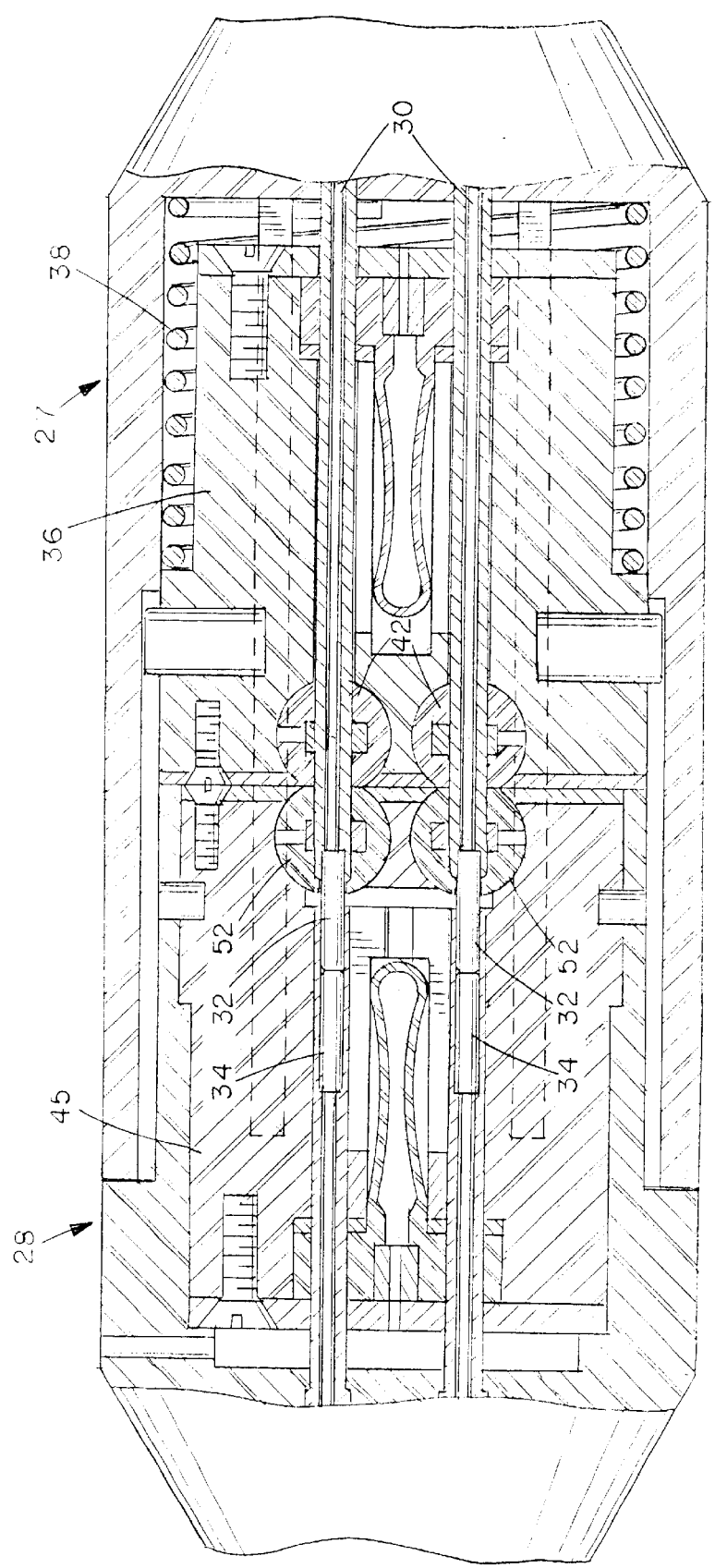
FIG. 7 is a sectional view of the connector elements of FIGS. 4 and 5 interconnected.

FIG. 2 illustrates a hybrid cable span forming part of a modular, undersea optical fiber telecommunication cable system according to an exemplary embodiment of the invention, while FIGS. 3 to 6 illustrate a single cable segment and FIG. 7 illustrates a junction between two cable segments in the system in more detail. The system basically comprises a series of cable segments 20,22,24 containing different optical fiber types A, B and C, respectively, which are secured together in sequence using connector assemblies 25, and optical devices 26 such as optical amplifiers also secured to the cable segment 20,24 at opposite ends of the sequence by connector assemblies 25. The three cable segments illustrated in FIG. 2 make up a hybrid span, and repeated hybrid spans may be constructed in the same way over the length of the cable system, which may be many miles in the case of a transoceanic telecommunication cable system. Each span may contain any desired number of cable segments of the same or different fiber types, and may also include cable segments of different lengths. The length of each cable segment or module is a function of the fiber type it contains, but segments may be suitably be provided in lengths of 5, 15, and 25 kilometers.

As illustrated in FIG. 3, each cable segment 20,22, or 24 has a plug unit 27 of an underwater connector secured at one end and a mating receptacle unit 28 secured at the opposite end. The optical amplifier or device 26 will also have either a plug unit 27 or a receptacle unit 28 secured at one side, and a cable segment secured to the opposite side via a suitable penetrator or bulkhead feedthrough connector, such as the penetrator or feedthrough described in U.S. Pat. No. 6,067,395 of Cairns et al., the contents of which are described herein by reference. In the example illustrated in FIG. 2, a cable segment 22 containing fiber type B is connected to the outer end of the optical device 26 at one end of the hybrid span, and a cable segment 20 containing fiber type A is connected to the outer end of the optical device 26 at the opposite end of the hybrid span. The receptacle unit secured to the inner end of optical device 26 is connected to a short length of cable 60 also containing fiber type B, and cable length 60 is connected to the inner end of optical device 26. Similarly, the plug unit secured to the inner end of optical device 26 at the opposite end of the hybrid span is connected to a short length 62 of cable containing fiber type A, and this cable length 62 is coupled to the optical device 26. Each optical device 26 is a pressure housing containing commercially available fiber and wavelength routing and amplification equipment. The plug or receptacle units may alternatively be mounted directly onto the pressure housing of the optical device, rather than via the short lengths 60,62 of cable, and connector units may be provided at both ends rather than only one end of the pressure housing, rather than providing some cable segments secured to a connector half at one end and to an optical amplifier device at the other end, as in FIG. 2. Additionally, optical devices 26 may also be connected to cables carrying different types of fibers to allow different sequences to be connected together dependent on system requirements.

The underwater connector 27,28 may be a dry-mateable or wet mateable fiber optic or electro-optic connector, such as the wet mateable, rolling seal connector described in U.S. Pat. Nos. 5,738,535 or 6,017,227 of Cairns, the contents of which are incorporated herein by reference, or the wet mateable, squeeze seal connector as described in U.S. patent Ser. No. application Ser. Nos. 09/418,145, filed Oct. 14, 1999, or 09/761,917 filed Jan. 17, 2001, both of Cairns, the contents of which are also incorporated herein by reference. Other types of dry or wet-mateable fiber optic or electro-optic connectors which are suitable for suboceanic use may alternatively be used. In FIGS. 3 to 7, a rolling seal, wet mateable connector is illustrated by way of example. In the illustrated embodiment, the connector is an eight-way fiber optic connector. However, it will be understood that a connector may provide for connection of a greater or lesser number of fibers, or both optical and electrical connections. In a typical undersea fiber optic telecommunications cable, at least four fiber pairs (eight individual fibers) will normally be provided, and in most cases a much larger number of fibers must be connected. This can be achieved by increasing the size of the connector shells to accommodate a larger number of rolling seals and contact terminals, without changing the basic structure or operation of the connector.

Figure 4:
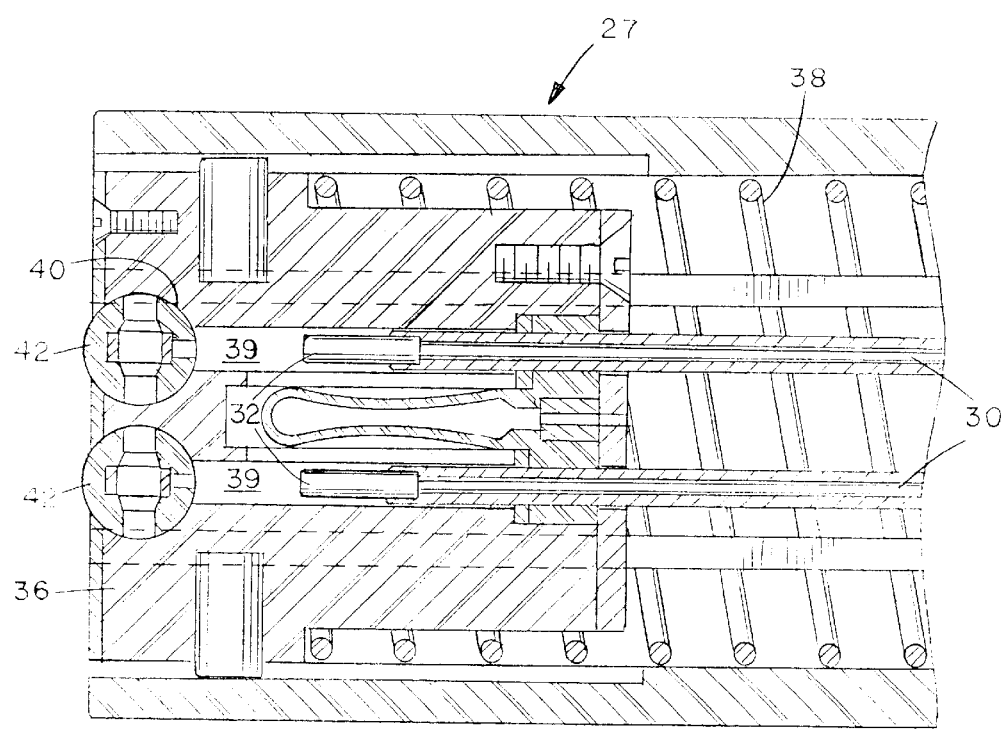
FIG. 4 is an enlarged sectional view taken on line 4—4 of FIG. 3.

Each cable segment will contain a plurality of optical fibers 30 of a selected type, and may also include electrical wires for required electrical signal communication. Each cable segment is suitably secured to the respective connector unit 27,28 at its opposite ends, with one end of each fiber 30 terminated to a respective optical contact or ferrule 32 in the plug unit 27, as illustrated in FIG. 4, and the opposite end of fiber 30 terminated to a respective optical contact or ferrule 34 in the receptacle unit 28, as indicated in FIG. 5. As indicated in FIG. 4, each plug unit 27 comprises an outer cylindrical shell 35 in which a plug contact manifold 36 is slidably mounted, and biased outwardly by spring 38 into the extended position of FIG. 4. The plug manifold 36 has a plurality of through bores 39 corresponding in number to the number of connections to be made. As noted above, in the illustrated embodiment, there are eight such through bores, and these are arranged in groups of four, terminating in a pair of parallel, part-cylindrical recesses 40. A pair of cylindrical, rolling seals 42 are rotatably mounted in the respective recesses, as illustrated in FIG. 6, and these seals will be in the closed position of FIG. 4 prior to connection of the plug unit with a mating receptacle unit, sealing the respective bores 39. The optical ferrules 32 are mounted in respective bores 39. If a greater number of optical connections are needed, the diameter of shell 27 is increased to allow for a larger manifold 36 with a larger number of through bores arranged in groups of four or more, and corresponding additional rolling seals for sealing the additional through bores. Electrical connections, if needed, will be provided in a similar manner, with electrical sockets provided in some of the through bores of one connector half for connection to electrical wires in the cable segment, and electrical probes provided in the other connector half for connection to the opposite ends of any electrical wires.

The receptacle unit 28 is illustrated in more detail in FIG. 5, and also has an outer shell 44 designed for sliding engagement in a mating plug shell 35, and a manifold 45 secured in shell 44. The manifold 45 has plural through bores 46 each containing a contact or ferrule 34 (or an electrical contact), with the optical fibers 30 extending through the rear end wall 48 of the shell into the respective bores 46. The bores 46 are again arranged in groups of four in a line, and terminate in part-cylindrical seats 50 in which rolling seals 52 are rotatably mounted. When the receptacle unit is unmated, the seals 52 will be in the closed position illustrated in FIG. 5, sealing each of the bores 46.

FIG. 7 illustrates the connection of the plug unit 27 at one end of one of the cable segments 20,22 or 24 with a mating receptacle unit 28 at one end of another cable segment 20,22 or 24. As the units 27,28 are mated together, shell 44 of the receptacle unit will enter shell 35 of the plug unit, pushing back the manifold 36 in the plug unit and compressing spring 38. At the same time, actuators in the two units, as described in U.S. Pat. Nos. 5,738,535 or 6,017,227, referred to above, will rotate the rolling seals 42,52 from the closed positions illustrated in FIGS. 4 and 5 into the open position illustrated in FIG. 7, so that each bore 39 in the plug unit communicates with an aligned bore 46 in the receptacle unit. The plug manifold 36 continues to be pushed inwardly into the shell, such that the ferrules 32 move out of the bores 39 and into the aligned bores 46, moving into optical contact with the opposing ferrules 34 in the fully mated position illustrated in FIG. 7.

In order to assemble the hybrid span illustrated in FIG. 2, a first cable segment 20 containing fiber type A is secured at one end to the amplifier device 26 by connecting the plug unit 27 at the end of segment 20 to the receptacle unit 28 at the end of device 26. The receptacle unit 28 at the opposite end of the first cable segment 20 is then secured to the plug unit 27 at one end of a subsequent cable segment 22 containing fiber type B. The receptacle unit 28 at the opposite end of the second cable segment 22 is then secured to the plug unit at one end of a third cable segment 24 containing a different fiber type C, and the receptacle unit 28 at the opposite end of the third cable segment is secured to the plug unit 27 of a second optical amplifier device 26 carrying a different cable type, such as cable type A. The procedure is repeated along the length of the suboceanic cable system according to predetermined specifications for reducing chromatic dispersion effects. It will be understood that the cable segments in each hybrid span may be of different lengths, and of different combinations of fiber types from that illustrated in FIG. 2, such as two segments of type A and one of type B, or two of type C and one of type A, and so on, and may contain more than three cable segments. The system may include cable segments of more than three different fiber types. The length of a cable segment is a function of the fiber type it contains, and cable segments will normally be provided in lengths of 5, 15 and 25 kilometers, although other lengths may be provided if needed.

Each cable segment or module may be of customer specified length, fiber count, and fiber type, and will be supplied with connector units secured to the opposite ends as indicated in FIG. 3, to provide a modular cable assembly which can be readily assembled on-site, either on a cable-laying vessel or at the ocean bed. The optical devices 26 may be optical amplifiers of the type used in suboceanic telecommunication systems, and/or other optical components such as fiber and wavelength routing equipment. In one arrangement, some or all of the optical devices may comprise an outer pressure housing containing commercially available fiber cross-connect and wavelength routing and amplification equipment. A suitable amplifier is the 1724-type EDFA of Agere Systems of Allentown, Pa. The fiber cross-connect may be a photonic switching sub-system as manufactured by Optical Micro Machines (OMM) of San Diego, Calif. This allows re-configuration of the optical fiber and/or electrical wire routing from one hybrid span to the next. The wavelength routing device may be a Wavestar™ DVDM as manufactured by Lucent Technologies, Murray Hill, N.J.

During deployment, two or three cable segments or modules will be joined together in the manner described above, in an appropriate, predetermined sequence following each optical amplifier in the transoceanic cable. The joining of the cable segments may be carried out on the cable ship before throwing the connected cable span overboard, or on the ocean floor after submerging the cable segments, using a remotely operated (or autonomous) underwater vehicle or ROV. Once laid on the ocean floor, the connected segments or modules form an integrated hybrid span. This process is repeated over the length of the transoceanic cable system.

By providing cable segments with plug and receptacle connector units at opposite ends, in the form of a fully integrated cable and connector module as illustrated in FIG. 3, the problems of the prior art cable splicing techniques are overcome. First, the use of releasably mateable underwater connectors provides a simple means of joining selected cable segments together, as well as an easy method of recovering, tuning, and re-deploying cable segments, using an ROV, on an individual, as-needed basis. The difficulties encountered in splicing together different fiber types of different physical characteristics are also avoided with this system and method, since the fibers are all terminated to optical contacts or ferrules which simply have to be brought into face-to-face contact in order to provide optical signal communication from one fiber type to the next.

Although an exemplary embodiment of the invention has been described above by way of example only, it will be understood by those skilled in the field that modifications may be made to the disclosed embodiment without departing from the scope of the invention, which is defined by the appended claims.

We claim:

1. A modular undersea optical fiber telecommunication system, comprising:
    a plurality of elongate cable segments each containing optical fibers extending side-by-side along the length of the respective cable segment, the fibers in at least one of the cable segments being of a fiber type different from the fibers in at least some of the other cable segments;
    each cable segment having a first end and a second end, a plug unit secured to the first end of the cable segment and a receptacle unit secured to the second end of the cable segment, the plug unit consisting of one half of an underwater connector and the receptacle unit consisting of a second, mateable half of the underwater connector, the plug and receptacle units each containing a plurality of optical fiber contact terminals, whereby the contact terminals in the plug unit of one cable segment are in optical contact with corresponding contact terminals in the receptacle unit of a second cable segment when the plug and receptacle units are mated;
    each optical fiber in each cable segment having a first end terminated to a respective one of the optical fiber contact terminals in the plug unit of the respective cable segment and a second end terminated to a respective one of the optical fiber contact terminals in the receptacle unit of the respective cable segment; and
    the plug unit of a selected first cable segment being releasably mated with the receptacle unit of a selected second cable segment and the receptacle unit of the first cable segment being releasably mated with the plug unit of a selected third cable segment, such that the optical fibers in said first cable segment are connected in series with the fibers in the second and third cable segments, and the cable segments are connected together end-to-end in a predetermined sequence;
    whereby fibers in at least one of the connected cable segments are of a different type to the fibers in at least some successive cable segments.

2. The system as claimed in claim 1, wherein the cable segments include segments of different lengths.

3. The system as claimed in claim 1, wherein the fibers in respective cable segments are of at least three different fiber types.

4. The system as claimed in claim 1, including a plurality of optical devices for connection in series with adjacent cable segments, each optical device having a first end secured to a predetermined cable segment and a second end secured to one half of an underwater connector for connection to a respective mateable half of the underwater connector consisting of a plug or receptacle unit at the end of another cable segment.

5. The system as claimed in claim 1, wherein the plug and receptacle units comprise mating halves of a wet-mateable connector, each plug and receptacle unit having at least one end seals for sealing the contact terminals when the respective unit is unmated.

6. The system as claimed in claim 5, wherein each plug and receptacle unit has at least one chamber sealed by said end seal and containing at least one contact terminal, and each end seals has at least one passageway communicating with the respective chamber, and each end seal is movable between a first position sealing said chamber when the units are unmated, and a second position in which said passageway in each end seal is aligned with the passageway in the end seal of a mated unit to permit a contact terminal from one unit to extend through the aligned passageways into the chamber of the other, unit for contact with the contact terminal in the other mated units said end seals being in sealing engagement when said units are connected together with the end seals in said second position.

7. The system as claimed in claim 6, wherein each end seal comprises a rolling, cylindrical seal member having a longitudinal axis and being rotatable about said axis between said first and second positions, each plug and receptacle unit having plurality of chambers with a contact terminal in each chamber, and each cylindrical seal member having a plurality of said passageways each consisting of a diametrical through bores extending through said cylindrical seal member in a direction transverse to said longitudinal axis for alignment with a respective one of said chambers in said second position.

8. A modular undersea optical fiber telecommunication system, comprising:

a plurality of cable segments each containing optical fibers, the cable segments being connected together end-to-end in a predetermined sequence on an ocean floor to form a hybrid span, the optical fibers in each cable segment being of a different fiber type from the optical fibers in at least some of the other cable segments;

each cable segment having a first end and a second end, a connector plug unit secured to the first end of the cable segment and a connector receptacle unit secured to the second end of the cable segment, each connector plug unit consisting of a first half of an underwater connector and each connector receptacle unit consisting of a second half of an underwater connector which is releasable mateable with the first half of an underwater connector:

each connector plug unit having a plurality of first fiber optic contact terminals and each connector receptacle unit having a plurality of second fiber optic contact terminals, whereby the first and second fiber optic contact terminals are in optical contact when two halves of an underwater connector are releasably mated together;

each optical fiber in each cable segment having a first end and a second end, the first end of the optical fiber being terminated to a respective one of the first fiber optic contact terminals in the plug unit of the respective cable segment and the second end of the optical fiber being terminated to a respective one of the second fiber optic contact terminals in the receptacle unit of the respective cable segment, and the cable segments being connected together end-to-end in the predetermined sequence along the length of the hybrid span via underwater connectors, each underwater connector consisting of the plug unit at the first end of one cable segment releasable mated with the adjacent receptacle unit of a successive cable segment in the span, whereby the optical fibers in each cable segment are connected end-to-end with the optical fibers in adjacent cable segments in the hybrid span, and the optical fibers in at least some successive cable segments are of different fiber types;

the cable segments together forming the undersea optical fiber communication system extending over a predetermined distance of a plurality of kilometers undersea between remote land locations.

9. The system as claimed in claim 8, including a plurality of optical devices secured in line with the cable segments at predetermined intervals along the sequence.

10. A method of installing a suboceanic hybrid optical fiber cable system, comprising the steps of:

determining a desired hybrid span sequence of successive telecommunication cable segments of predetermined length, fiber count, and fiber type, each cable segment having a connector plug unit at a first end and a connector receptacle unit at a second end, and containing optical fibers of a fiber type different from the optical fibers in at least some of the other cable segments;

securing the cable segments together end-to-end in the desired sequence by securing the connector plug unit at the first end of a first cable segment in the sequence to the connector receptacle unit at the second end of a second cable segment in the sequence, securing the connector plug unit at the first end of the second cable segment to a the connector receptacle unit at the second end of a third cable segment in the sequence, and repeating the procedure along the sequence until the desired hybrid span sequence is completed; and installing the hybrid span sequence on an ocean floor to extend over a distance equal to a plurality of kilometers so as to form at least part of a transoceanic cable system.

11. The method as claimed in claim 10, wherein a plurality of cable segments are secured together end-to-end on board a ship using the connector plug and receptacle units, and are subsequently submerged and laid on the ocean floor.

12. The method as claimed in claim 10, wherein a plurality of cable segments are separately submerged and are secured together on the ocean floor in the desired sequence using a remotely operated vehicle.

13. The method as claimed in claim 10, including the step of securing optical devices at predetermined intervals in the hybrid scan sequence using releasable underwater connectors.

14. The method as claimed in claim 10, including the step of tuning the hybrid span sequence by disconnecting the connector plug units at the first ends of a selected cable segment to be removed from the connector receptacle unit at the second end of a first, previously connected adjacent cable segment and disconnecting the connector receptacle unit at the second end of the selected cable segment from the connector plug unit at the first end of a second, previously connected adjacent cable segment, and attaching a new cable segment to the first and second adjacent cable segments in place of the removed selected cable segment using identical connector plug and receptacle units at opposite first and second ends of the new cable segment.

15. The method as claimed in claim 14, in which the new cable segment is of a different fiber type from the removed segment.

16. The method as claimed in claim 14, wherein the new cable segment is of different length from the removed segment.

17. The method as claimed in claim 14, wherein the step of tuning the hybrid span sequence includes removing and replacing additional selected segments of the sequence.

18. The method as claimed in claim 14, wherein the step of tuning the hybrid span sequence takes place at the ocean floor using a remotely operated vehicle to release and secure the underwater connector plug and receptacle units.

* * * * *